June 16, 1942.    L. E. LADD    2,286,743
AUTOMATIC FISHING DEVICE
Filed April 18, 1941
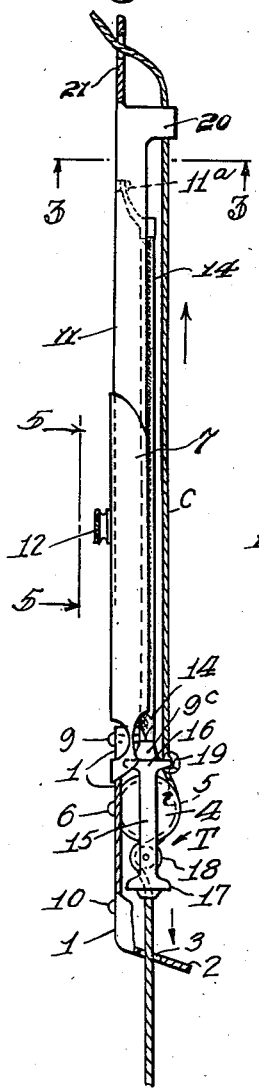
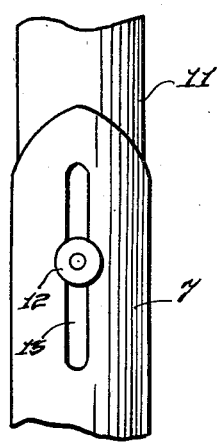
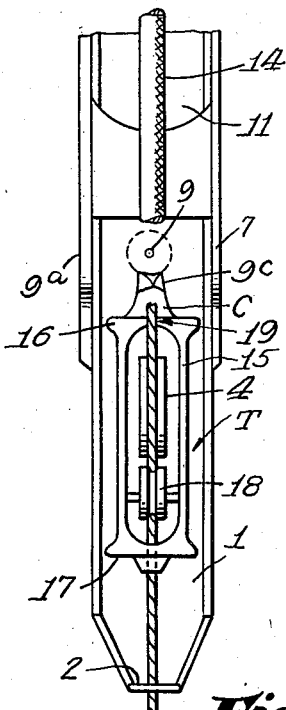
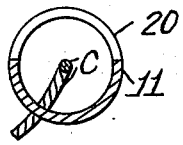
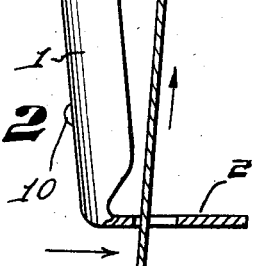
Lawrence E. Ladd
INVENTOR.
BY John M. Spellman

UNITED STATES PATENT OFFICE 2,286,743

AUTOMATIC FISHING DEVICE

Lawrence E. Ladd, Dallas, Tex.

Application April 18, 1941, Serial No. 389,143

4 Claims. (Cl. 43—15)

This invention relates to fishing tackle of a type capable of being used on a fishing line and placed in a "set" position whereby a pull on the line will release the set position of the device in catching fish.

In carrying out the invention due consideration has been given to the fact that frequently, due to inalertness on the part of the fisherman in watching the float, the fish will bite or strike the baited hook and no catch will be made because of delay or slowness of the fisherman in jerking the line. Also due to inexperience some fishermen are not aware that a fish has taken the baited hook, as some fish bite very daintily and the float does not submerge or move very fast and the line is not jerked at the proper time.

It is therefore the primary object of this invention to provide an automatic fishing device which may be attached to a fishing line at a point near the hook or adjacent the float and which has a trip arrangement and when a pull on the line carrying the hook is made the device will automatically jerk sufficiently to firmly fasten the hook in the fish's mouth.

The invention also provides a fishing device of this nature which is strong, durable in construction, easily operated and controlled and which can be manufactured and sold at a comparatively low price.

The invention may be readily understood from a perusal of the following detailed description, taken in connection with the accompanying drawing, and in the drawing:

Figure 1 is a side elevational view of the improved fishing device disposed in a vertical or fishing position, and partly broken away;

Figure 2 is a slightly enlarged detail sectional view of the lower end of the device illustrating the position of the trip mechanism in a released position;

Figure 3 is a cross-sectional view of Figure 1, taken along the line 3—3 thereof;

Figure 4 is a detail fragmentary plan view of the trip mechanism in a set position, the view being enlarged, and Figure 5 is a view similar to Figure 4, but taken from the back or rear side of the device, and showing an adjusting means.

In Figure 1 is shown the completely assembled fishing device in a vertical or fishing position. The body parts are made of brass tubing cut away to provide the channel-like pieces. The member 1 has the walls of the channel cut away to provide a flattened extremity indicated at 2 which is bent at an angle as shown in Figures 1 and 2 to provide a support and guide for a fishing line or cord C which is slipped through a hole 3. Approximately midway of the ends of the piece or member 1 is a circular support 4 in the form of a cam and which has a groove 5 and over which the line is made to travel. This support 4 is fixed to a member 1 by a screw 6. One end of the member 1 is nested in a member 7, alike in shape to member 1. Brads or eyed rivets 9—a hold the members 1 and 7 in hinged engagement. The opposite end of the member 1 has adjusting screws 6 and 10, respectively, for varying the position of the support 4. A third member 11, similar in construction to members 1 and 7, has one end nested in the member 7 and is longitudinally adjustable therewith by means of a knurled nut and stud bolt 12 in connection with the slot 13 in the member 7. This slot and bolt arrangement enables the two members 7 and 11 to be adjusted with respect to one another to vary the tensional or pulling effect of a rubber cord or elastic band 14 which provides the jerking motion on the line when the tripping mechanism is released.

The tripping means T consists of a member having the spaced lengths 15 formed integrally with the circular ends 16 and 17 and to the end 16 is secured one end of the elastic or rubber band or cord 14 by the thimble 9—c, the opposite end of this band being fixed in the member 11 at 11—a. In the end 17 of the tripping member is passed the fishing line C, the line passing under a small pulley 18, seated on a pin in the spaced lengths 15. The pulley 18 is grooved to make the line track thereover and the line after passing under the pulley is looped as at 19 to one end of the tripping member as shown in Figures 1 and 2.

Figures 1 and 4 show the set position of the trip means T and in this position the trip means has its lengths 15 straddling the support 4 with the end 9—c directly over a set screw 9 in one end of the member 1. The pulley 18 then bears against the support and under tension of the rubber cord 14. A pull on the line C in the direction indicated by the arrow will obviously release the trip means.

In the operation of the device, a "sinker" may be used if desired, in addition to the fishing device itself which also may be utilized as a sinker alone. The preferred utilization of the device is in a vertical position, although it may be fastened to a fishing pole. In Figure 1 the tripping means T is seated inside the member 1 directly over the set screw 9 where the screw 9 will bear against the end 9—c of the trip means and adjacent the end 16. When in this position, and since the fishing line C is resting in the groove 5 in the support 4 and the line passes under the pulley 18, a pull or jerk on the line C will release the end 17 from contact with the support 4 and the rubber cord will pull the trip means upwardly, as shown in Figure 2. The degree of upward pull or jerking movement will depend upon the amount of tension of the rubber cord and which may be gaged according to the adjustment between the members 7 and 11 by the stud and nut and by the position of the support 4. A delicate and fine adjustment of the trip means T is obtained by the screw 9, which when moved inwardly or outwardly varies the pull necessary to bring about a release.

The line C extends from the looped position shown at 19 to and through the portion 20 of the member 11, the end of which at 21 is flattened out and has an eye for the passage of the line C, to the fishing pole. The trip means may also be released by a pull on the line in the direction of the horizontally positioned arrow in Figure 2, which pull will move the member 1 to the angular position with respect to the member 7 and thus release the pulley 18 from against the support 4.

The tripping means may also be released by a pull on the line in the direction of the horizontally positioned arrow in Figure 2, which pull will move the member 1 to the angular position with respect to the member 7 and thus pull the screw 9 from against the end 17 of the tripping means.

While the disclosure reveals a practical working embodiment of the invention which has been successfully demonstrated by actual use, it is obvious that changes and modifications may be made therein such as would be within the scope and meaning of the appended claims.

What is claimed is:

1. An automatic fishing device, in combination with a fishing line, comprising a plurality of channel-shaped members disposed in adjustable and hinged relation, a tripping member, means connected to one end of the tripping member to provide a tensional pull on said tripping member in a set position of the tripping member, means for holding the tripping member in a set position, and means for adjusting the tripping member.

2. An automatic fishing device, in combination with a fishing line, comprising a plurality of trough-like elongated members disposed in adjustable and hinged relation, one of said members having a support for the fishing line with a groove for guiding the line thereover, a tripping member, a resilient tensioning member secured to the tripping means, a pulley in the tripping member for directing the fishing line from said support and guide under the pulley, the axis of the pulley being below the line of travel of the line on the support, means for holding the tripping member in a set position under tension of the resilient member, said tripping member being released from a set position by a pull on the fishing line and thereby jerking the line.

3. An automatic fishing device adapted to be used on a fishing line, comprising a plurality of trough-like members disposed in a nested relation and having hinged and adjustable means; one of said members having a substantially grooved cam-shaped member for supporting a fishing line and guiding the same through the device, a tripping member through which the line passes and to which the line is looped and continued to one end of the device, a roller in the tripping member under which the line is directed, means for holding the tripping member in a set position, means for exerting a tensioning effect on the tripping member while in said set position, said cam-shaped member and said roller being so related and positioned that the fishing line when pulled will exert a pull on and under the roller thereby lifting the tripping member and roller and releasing same from the set position thereof.

4. A fishing device as claimed in claim 3, two of said trough-like members being hinged together, one of said hinged members carrying a cam-shaped member and having a screw set adjustably in one end for adjusting the position of the cam-shaped member and a screw in its opposite end for changing the amount of trip release.

LAWRENCE E. LADD.